United States Patent [19]

Shirakawa

[11] E Re. 28,611

[45] Reissued Nov. 11, 1975

[54] VARIABLE CONDENSER

[75] Inventor: Takashi Shirakawa, Furukawa, Japan

[73] Assignee: Alps Electric Co., Ltd., Tokyo, Japan

[22] Filed: Jan. 22, 1975

[21] Appl. No.: 542,901

Related U.S. Patent Documents

Reissue of:

[64] Patent No.: 3,818,287
Issued: June 18, 1974
Appl. No.: 301,909
Filed: Oct. 30, 1972

[30] Foreign Application Priority Data

| | | |
|---|---|---|
| Oct. 30, 1971 | Japan | 46-100992[U] |
| Mar. 3, 1972 | Japan | 47-26317[U] |
| June 1, 1972 | Japan | 47-64600[U] |

[52] U.S. Cl. ..... 317/254; 317/249 D; 317/253
[51] Int. Cl.[2] ..... H01G 5/38
[58] Field of Search..... 317/253, 254, 249 D

[56] References Cited

UNITED STATES PATENTS

| | | | |
|---|---|---|---|
| 1,537,561 | 5/1925 | Stern | 317/253 |
| 1,840,298 | 1/1932 | Andrews | 317/254 |
| 2,079,921 | 5/1937 | Osnos | 317/253 |
| 3,204,163 | 8/1965 | Halftermeyer | 317/253 X |
| 3,209,219 | 9/1965 | Masui | 317/249 D |
| 3,404,322 | 10/1968 | Repko | 317/253 |

FOREIGN PATENTS OR APPLICATIONS

| | | | |
|---|---|---|---|
| 788,614 | 1/1958 | United Kingdom | 317/253 |

*Primary Examiner*—E. A. Goldberg
*Attorney, Agent, or Firm*—Guy W. Shoup

[57] ABSTRACT

A variable condenser has a stator, a plurality of pole braces for the stator, electrode plates having a hole at a projection thereof for receiving the pole braces of the stator. A synthetic resin film coats both surfaces of the electrode plates excluding the projection so that the size of the film depends upon the size of the electrode plates. A rotor shaft, and spacers, are carried by the condenser and the film is cut out adjacent the rotor shaft and the spacers contact the film. Thus, the pole braces of the stator are simply mounted to the capacitor.

7 Claims, 6 Drawing Figures

VARIABLE CONDENSER

Matter enclosed in heavy brackets [ ] appears in the original patent but forms no part of this reissue specification; matter printed in italics indicates the additions made by reissue.

BACKGROUND OF THE INVENTION

Field of the Invention

This invention relates to a variable condenser, and more particularly to improvements of the variable condenser used in a radio receiver, etc.

Objects of the invention

It is an object of the present invention to improve the mounting structure of the electrode plate of the stator in a variable condenser.

It is another object of the present invention to improve the disposition of the electrode plate of the stator.

It is a further object of the present invention to improve the mounting of the pole brace of the stator.

It is still another object of the present invention to improve the dust cover of a variable condenser.

It is still another object of the present invention to improve the mounting structure of the ground plate of a trimmer.

It is still another object of the present invention to improve the mounting structure of the shield thereof.

SUMMARY OF THE INVENTION

One characteristic feature of the present invention is the provision of projections of different height at the front and rear side plates so as to easily mount and to positively dispose effectively the electrode plate of the condenser stator.

Another characteristic feature of the present invention is the simple and positive mounting of the pole brace of the stator by screwing the pole brace of the stator having a male thread portion to the inserting hole of the pole brace having a female thread portion at part of the projection of the front side plate.

A further characteristic feature of the present invention is the provision of a positive and easy electric and mechanical mounting of the ground plate of the trimmer by providing a recess guide groove at the inner side of the dust cover and by containing the ground lead terminal of the ground plate of the trimmer in the guide groove.

Still another characteristic feature of the present invention is the provision of the positive and simple mounting of a shield plate by providing the recess guide groove of the dust cover and an open hole communicating with the guide groove and by inserting the end of the shield plate into the guide groove through the open hole.

Still another characteristic feature of the present invention is the provision of a positive electric connection of the shield plate to the ground plate of the trimmer by containing the end of the shield plate and the ground lead terminal of the ground plate of the trimmer in the guide groove of the dust cover.

Still another characteristic feature of the present invention is the provision of a positive and simple, electric and mechanical mounting of a variable condenser by providing the terminal projecting from the front side plate integral with the pole brace of the stator to form the terminal for mounting the printing substrate.

These and other objects, features and advantages of the present invention will become apparent from the following description taken in conjunction with the accompanying drawings.

DESCRIPTION OF PREFERRED EMBODIMENTS

Figure 1:
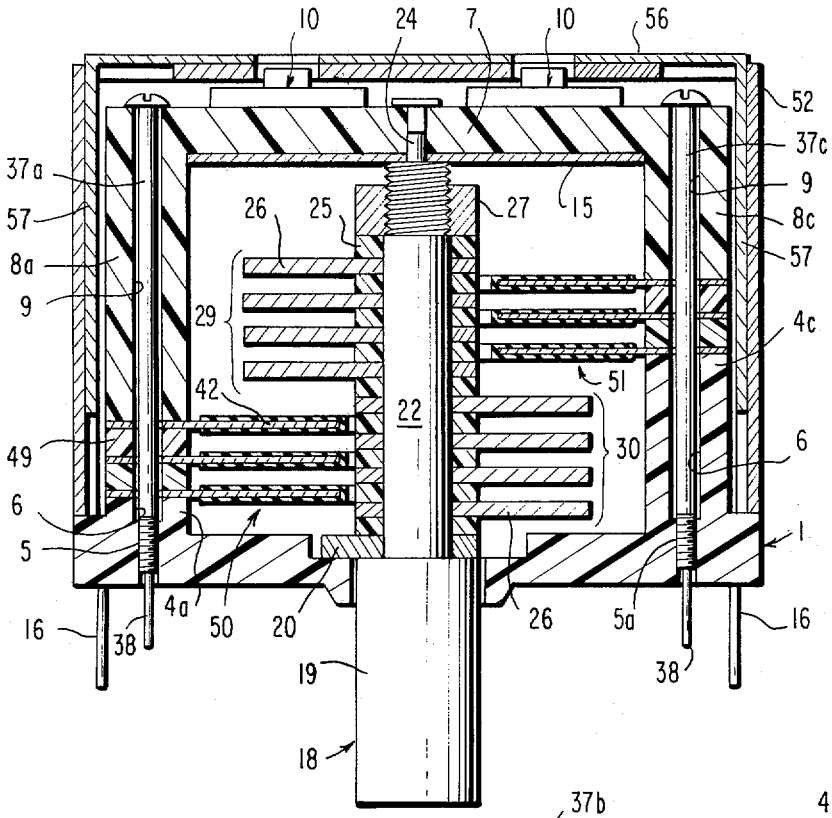
FIG. 1 is a sectional side view of one embodiment of the variable condenser of the present invention.

In the drawings, numeral 1 represents a front side plate composed of an insulator. A rotor shaft inserting hole 2 is provided at the center of the front side plate 1. A sector recess portion 3 for stopping is provided on the back surface of the front side plate 1. At 4a, 4b, 4c and 4d are projections of different height provided integrally with the gront side plate, each projection having a pole brace inserting hole 6 partly including female thread portion 5. 7 represents a rear side plate composed of insulator material having plural projections 8a, 8b, 8c and 8d of different height, each having a pole brace inserting hole 9 at the center. When the front and rear side plates 1 and 7 are assembled, the projection 8a of the rear side plate 7 is oppositely faced with the projection 4a of the front side plate 1, the projection 8b is such with the projection 4b, the projection 8c is such with the projection 4c, and the projection 8d is such with the projection 4d. A trimmer condenser group 10 is formed on the rear side plate 7 composed by superimposing, in turn, film 13 and trimmer rotor plates 14 on the trimmer stator plate 11 with a terminal adhered to the back surface of the rear side plate 7 and auxiliary plate 12, simultaneously putting trimmer ground plate 15 having a pair of terminals 16 and 16 on the inner surface of the rear side plate 7, and mounting the film 13, trimmer rotor plate 14 and trimmer ground plate 15 on the rear side of plate 7 with headed rivets 17.

Each auxiliary plate 12 provided on the trimmer condenser group 10 is isolated electrically and serves to effect smooth rotation of its rotor plate 14. A rotor shaft 18 has an operating portion 19, a stopper plate 21 having stopper projection 20, a small diameter portion 22, a threaded portion 23 and a small projection 24. Rotor electrode plate groups, 28, 29, 30 and 31 are composed, by inserting alternatively, the spacers 25 and rotor electrode plates 26 onto the small diameter portion 22 of the rotor shaft and finally screwing the nut 27 to the threaded portion 23 to fix the rotor electrode plates 26 to the rotor shaft 18. The rotor electrode plate groups 28 and 29 are mounted in different directions at 180 with each other, and the rotor electrode plate groups 30 and 31 are mounted in different directions at 180 with each other and at 90 with respect to the rotor electrode group 28.

The rotor shaft 18 is so mounted that the operating portion 19 projects outwardly from the inserting hole 2 of the front side plate 1 and to dispose the stopper projection 20 in the sector recess 3, and to engage the center hole 15a of the trimmer ground plate 15 and the inserting hole 9 of the rear side plate 7 with the small projection 24 provided at the end of the rotor shaft 18 and to interleave the front and rear side plates 1 and 7.

The rotor shaft 18 is so stopped in rotation that the stopper projection 20 contacts the step of the sector recess 3.

37a, 37b, 37c and 37d represent stator pole braces, each having a terminal 38 composed of a small diameter portion, male threaded portion 39, larger diameter portion 40 and head 41. Stator electrode plates 42, each having a pole brace inserting hole 44 within the projection 43 of the stator electrode plate. Synthetic resin film 46 composed of crystalline polyolefin such as polyethylene covers both surfaces excluding the projection 43 of each stator electrode plate. The film 46 is larger than the stator electrode plate 42, and the edge of the film 46 projects outwardly from the edge 45 of each stator electrode plate 42, and particularly the film extending portion 48 disposed at the semi-circular cutout portion 45 of the stator electrode plate 42, provided for escaping the rotor shaft 18, so extends outwardly from the edge of the cutout portion 47 until it coincides with the diameter of the spacer 25 on the rotor shaft 18, and this extending portion 48 contacts with the spacer 25 on the rotor shaft 18 or slidably with the rotor shaft 18 as will be described hereinafter.

Then, the assembling of the stator electrode plates 42 will now be described. The respective pole braces 37a, 37b, 37c and 37d are inserted into the holes 9 provided at four corners of the rear side plate 7 so that part of the respective pole braces 37a, 37b, 37c and 37d are projected from the projections 8a, 8b, 8c and 8d in such a manner that the stator electrode plates 42 and the spacers 49 are alternatively received by the pole braces 37a to form the stator electrode plate group 50, and the stator electrode plates 42 and the spacers 49 are alternatively received by the pole brace 37c to form the stator electrode plate group 51, and further a single stator electrode plate 42 is received by the pole braces 37b, and 37d, respectively, in which state the projections 4a, 4b, 4c and 4d of the front side plate 1 coincide with the pole braces 37a, 37b, 37c and 37d at holes 6 so that the respective pole braces are engaged with the front side plate 1, and then the respective pole braces 37a, 37b, 37c and 37d are screwed at the female thread portions 5 to mount respectively, stator electrode plates 42.

Figure 2:
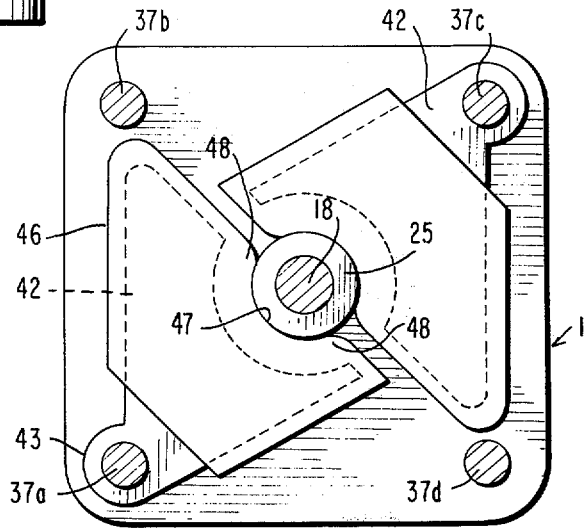
FIG. 2 is a sectional view of the mounting of the electrode plate of the stator where the extended portion of the film contacts the spacer on the rotor shaft.
Figure 3:
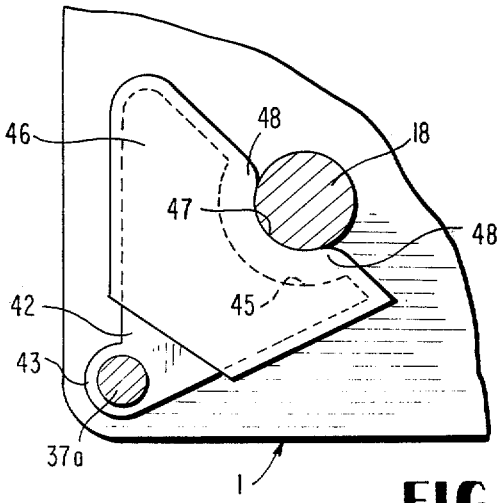
FIG. 3 is an enlarged, sectional view of the invention wherein the extended portion of the film directly contacts the rotor shaft.
Figure 4:
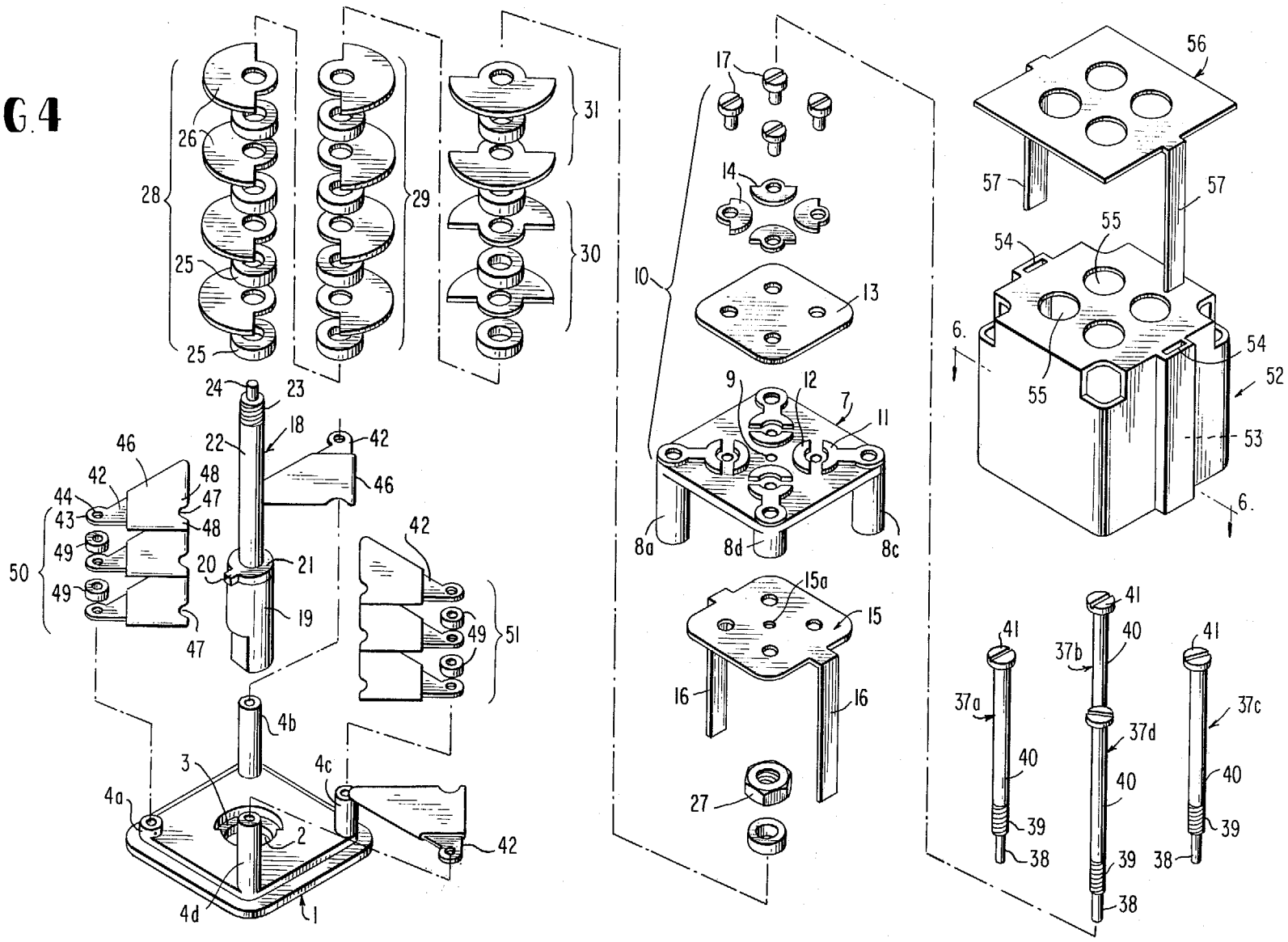
FIG. 4 is an exploded perspective view of the details of the variable condenser of the present invention.

Thereby, the stator electrode plate groups 50 and 51, and the single stator electrode plate 42 are, in turn, mounting stepwise from the front side plate 1, and the terminals 38 of the respective pole braces 37a, 37b, 37c and 37d project from the respective holes 6 of the front side plate 1, these terminals 38 become the drawer terminals of the stator electrode plates 42. After the respective stator electrode plates 42 are assembled, as seen from FIG. 2, the film extending portion 48 comes into contact with the outer periphery of the spacer 25 on the rotor shaft 18, and accordingly, the electrode plates 42 are supported by one pole brace and the extending portion 48 of the rotor shaft 18. As seen in FIG. 3, the extending portion 48 may be in direct contact with the outer periphery of the rotor shaft

18. Further, the stator electrode plate group 50 forms one variable condenser by cooperating with the rotor electrode plate group 28, and the stator electrode plate group 51 forms the variable condenser by cooperating with the electrode plate group 29, stator electrode plate 42 forms the condenser by cooperating with the rotor electrode plate group 30, stator electrode plate 42 forms the condenser by cooperating with the rotor electrode plate group 31, and accordingly the embodiments of the drawings show four series variable condenser.

Figure 5:
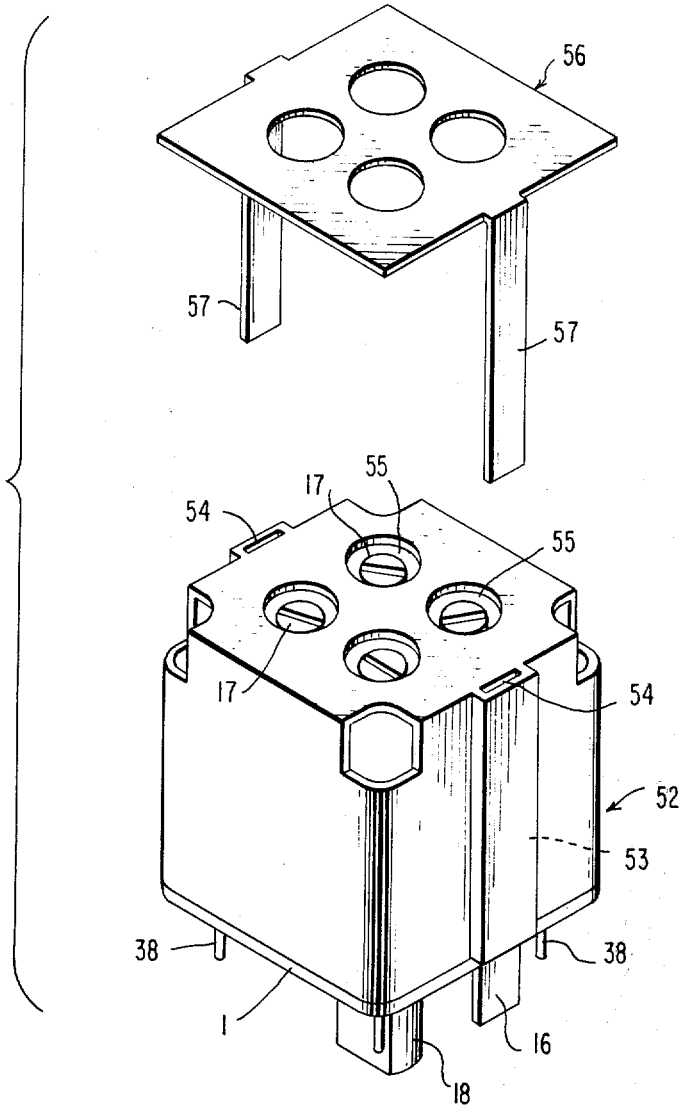
FIG. 5 is an exploded perspective view showing one way of assembling the condenser.
Figure 6:
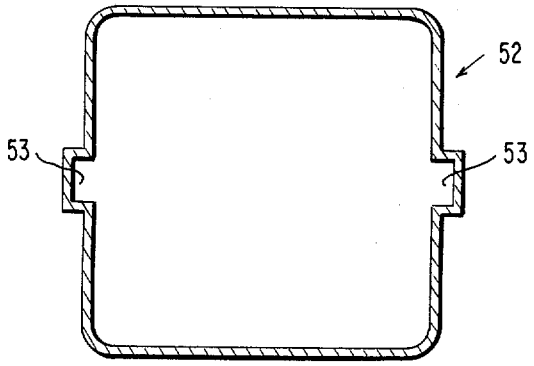
FIG. 6 is a plan sectional view of the dust cover along the line 6 — 6 in FIG. 4.

At FIG. 5, 52 represents a dust cover of synthetic resin such as polypropylene having ground lead terminals 16 and 16 of the trimmer ground plate 15, recess guide grooves 53 for containing, open holes 54, communicating with the guide grooves 53 and 53, and holes 55 for adjusting the trimmer groups 10. The cover 52 is so mounted as to strongly engage the rear and front side plates 7 and 1 to cover the stator electrode plate 42 and rotor electrode plate 26 from the rear side plate 7 side, and when the cover 52 is mounted, the ground lead terminals 16 and 16 are disposed themselves in the recess guide grooves 53 and 53 by their resiliency, and the terminals of the ground lead terminals 16 and 16 extend beyond the front side plate 1 to project forwardly. Shield plate 56 is composed of thin metal plate having terminals 57 and 57, and trimmer group adjusting hole 58 is mounted by inserting the terminals 57 and 57 into the recess guide grooves 53 and 53 through the opens holes 54 and 54 of the cover 52, and in mounting, the terminals 57 and 57 of the shield plate 56 contact the ground lead terminals 16 and 16.

The present invention has been described with respect to the particular embodiments, but, for example, the projections provided at the front and rear side plates have four different heights, but two may be of the same height and the other two may be different in height, as such, the present invention may not only be limited to the above embodiments, but various alterations may be possible as understood easily within the scope of the present invention.

What is claimed is:

1. A variable condenser comprising:

front and rear side plates, projections extending respectively from said front and rear side plates and toward each other, pole brace inserting holes within said projections of said front side plates and carrying female threads therein, pole braces at each projection location and having a threaded portion screwed into the threaded portion of said pole brace inserting hole within said front side plate projection, stator electrode plate groups interleaved between the projections of said front and rear side plates respectively, and spacer groups intermediate said stator electrodes, a dust cover engaging said front and rear side plates having a rear surface and side surfaces, said dust cover being formed of synthetic resin, having guide grooves at the side surfaces and having open holes communicating with the guide grooves at its rear surface.

2. The variable condenser as claimed in claim 1, further comprising a trimmer ground plate having a ground lead terminal and a shield plate having a terminal, and wherein the ground lead terminal of the trimmer ground plate and the terminal of the shield plate are carried by a guide groove of the dust cover to electrically connect both said terminals.

3. A variable condenser comprising:

front and rear side plates, projections extending respectively from said front and rear side plates and toward each other, pole brace inserting holes within said projections of said front side plates and carrying female threads therein, pole braces at each projection location and having a threaded portion screwed into the threaded portion of said pole brace inserting hole within said front side plate projection, stator electrode plate groups interleaved between the projections of said front and rear side plates respectively, and spacer groups intermediate each of said stator electrodes, wherein on each of both front and rear side plates at least two of said projections are of a different height.

4. A variable condenser comprising a housing, a stator and a rotor, said stator comprising:

at least one pole brace fixed on said housing, stator electrode plates having a projection extending outwardly therefrom, with a hole in said projection for receiving the pole brace and an indented portion, said rotor comprising:

a rotor shaft rotatably mounted on said housing, spacers carried on said shaft, and metal conductive rotor electrode plates without resin film or other insulative coatings on said rotor plates, said rotor plates being positioned between said spacers and carried by said rotor shaft, a synthetic resin film coating both surfaces of the stator electrode plates including said indented portion and excluding said projection so that the said indented portion slidably rides on said rotor.

5. A variable condenser as in claim 4 wherein the indented portion slidably rides on the rotor shaft of said rotor.

6. A variable condenser as in claim 4 wherein the indented portion slidably rides on said spacers of said rotor.

7. A variable condenser comprising a housing, a stator and a rotor, said stator comprising at least one pole brace fixed on said housing, stator electrode plates having a projection extending outwardly therefrom and supported by a single pole brace, with a single hole in said projection for receiving the pole brace, and a rotor shaft rotatably mounted on said housing, spacers carried on said shaft, and metal conductive rotor electrode plates within resin film or other insulative coatings thereon positioned between said spacers and carried by said rotor shaft, wherein each of said stator plates is shaped substantially triangular and has a projection and an indented portion, each of said indented portions of said stator plates being positioned adjacent said rotor shaft.

* * * * *